United States Patent [19]

Wood

[11] 3,743,422

[45] July 3, 1973

[54] OPTICAL IMAGE PROCESSOR

[75] Inventor: Wilbur R. Wood, Ellicott City, Md.

[73] Assignee: Westinghouse Electric Corporation, Pittsburgh, Pa.

[22] Filed: June 18, 1970

[21] Appl. No.: 47,298

[52] U.S. Cl. ......... 356/71, 250/219 CR, 350/162 SF

[51] Int. Cl. ........................................... G06k 9/08

[58] Field of Search ................. 350/162 SF; 356/71; 250/219 CR

[56] References Cited

FOREIGN PATENTS OR APPLICATIONS 1,143,086 2/1969 Great Britain

*Primary Examiner*—Ronald L. Wibert
*Assistant Examiner*—F. L. Evans
*Attorney*—F. H. Henson, E. P. Klipfel and S. Weinberg

[57] ABSTRACT

A processing array which permits the simultaneous filtering of a single input image by a number of different spatial frequency filters. A coherent collimated beam of light is divided into a plurality of smaller beams. The smaller beams are then collimated and are directed through a single portion of an input transparency. The beams coming from the input transparency are then directed through a transforming lens which produces the Fourier transform of each of the beams in the focal plane of the transforming lens. Because the Fourier transform of each beam is located at a different position in the Fourier plane, a different filtering operation can be performed at each of the points in the Fourier plane.

10 Claims, 6 Drawing Figures

WITNESSES
Alfred G. Colaizzi
Leon M. Garman

INVENTOR
Wilbur R. Wood

Stanley Weinberg
ATTORNEY

OPTICAL IMAGE PROCESSOR

BACKGROUND OF THE INVENTION

1. Field of the Invention

In general, the invention relates to pattern recognition. More specifically, it relates to the recognition of a letter, a word, a number, or a group of numbers by subjecting the image of these patterns to a number of filters.

2. Description of The Prior Art

For a number of years, efforts have been underway in many laboratories throughout the country to develop techniques and machines which will recognize patterns in optical images. The particular interests are in character recognition and recognition of patterns in photographs, especially aerial photographs.

Up until now, the prior art techniques of character recognition have been slow and tedious. The reason for this was the necessity for sequentially introducing a number of filters in front of each segment of the input pattern. The final results could only be obtained by a number of such trial and error experiments. Once recognition of a particular segment of a pattern was obtained, the information would have to be stored in some kind of memory bank until other segments of the pattern were recognized in like manner. Techniques which have been employed include use of digital computers and coherent optical matched spatial filtering. The algorithms used with the digital computers for pattern recognition become quite complex and require a considerable amount of computer time. A typical system is described in some detail in "Optical and Electro-Optical Information Processing" (1965) by Tippett, Berkowitz, Clapp, Koester and Van Derburgh, Jr. (see chapter 7).

BRIEF SUMMARY OF THE INVENTION

The present invention, however, provides a marked advance over the prior art systems. Instead of permitting only one character recognition at a time, it permits a large number of such recognitions to be performed simultaneously. This function is made possible by an optical processor which divides a collimated light beam into a number of such beams. The beams are then passed through approximately the same portion of an input transparency the information of which is desired at some output. Each of the beams is then directed through a lens which performs a Fourier transform on each of the beams.

The geometry of the system causes each of the beams to set up a separate diffraction pattern in a different position in the Fourier plane. Each diffraction pattern represents the entire input image which is being illuminated by the plurality of beams. It is then possible to place a different filter at each of the points in the Fourier plane. If, for example, there are six different diffraction patterns in the Fourier plane, six different filters can be operating in the Fourier plane simultaneously. Therefore, pattern recognition will be taking place six times faster than was possible in the prior art devices.

BRIEF DESCRIPTION OF THE DRAWINGS

For a better understanding of the invention, reference may be had to the preferred embodiment, exemplary of the invention, shown in the accompanying drawings in which.

DETAILED DESCRIPTION OF THE INVENTION

Coherent optical image processing techniques have generated particular interest since the advent of the highly coherent gas laser. These techniques are based upon the fact that a lens can perform a Fourier transformation upon an image incident upon it. The Fourier transform is displayed in the focal plane of the lens.

Figure 1A:
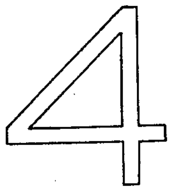
FIG. 1A PRIOR ART
FIG 1A shows a typical character and FIG. B an approximation of its Fourier transform.
Figure 1B:
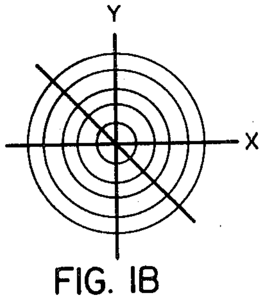
FIG. 1B PRIOR ART

FIG. 1A shows a rough approximation of what might be a typical image as shown by the number 4. A rough approximation of its Fourier transform as it would be displayed on a screen in the Fourier plane of a lens is shown in FIG. 1B. Most of the light energy is concentrated at the zero frequency. The zero frequency point is surrounded by energy paths at varying radii from the zero frequency point. The zero frequency point is located at the intersection of the X and Y axes.

It is a characteristic of the Fourier transform that straight lines in an object give rise to straight lines of energy in the Fourier plane which are perpendicular to the lines in the object. Accordingly, FIG. 1B shows an energy distribution along the X axis because the X axis is perpendicular to the vertical member of the number 4. It also shows energy distribution along the Y axis and along a line approximately 45° from the Y axis because these lines are also perpendicular to lines on the number 4.

A filter could be made of the diffraction pattern of the number 4 by placing a negative in the Fourier plane of a lens. This could then be made into a positive by well known methods. If, then, the resulting filter were placed in a Fourier plane of some input, and if the number 4 were present in the input, only the number 4 would be passed by the filter. Anything else which might be present in the input would be blocked by the filter.

Figure 2:
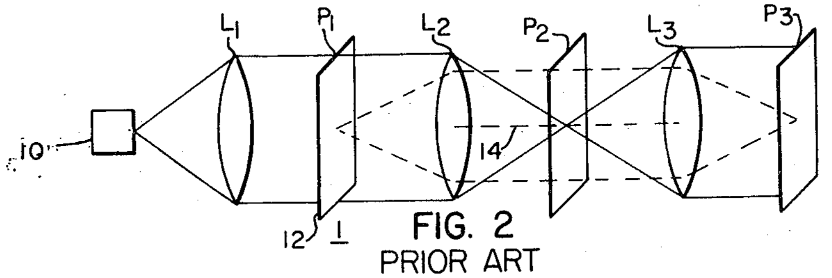
FIG. 2 PRIOR ART
FIG. 2 shows a typical lens system of the prior art which can be used for pattern recognition.

FIG. 2 shows the basic coherent optical image processing system 1 of the prior art. Lens $L_1$ is a collimating lens. Input transparency 12, which contains the unknown information, is located in plane $P_1$. Lens $L_1$ collimates the light from a source of coherent radiation such as a laser 10 and causes it to pass through the input transparency 12 at its location in plane $P_1$.

Lens $L_2$ is the transform lens. Input transparency 12 in plane $P_1$ is located at one focal point of the lens $L_2$. At the other focal point of lens $L_2$ is the Fourier transform plane or filter plane $P_2$. It is in this plane, $P_2$, that the two dimensional Fourier transform of the input image appears. That is, a two dimensional spatial frequency spectrum or far field diffraction pattern of the input image is displayed. Reconstruction lens $L_3$, with one focal point lying in plane $P_2$, will reconstruct the input image in its other focal plane $P_3$.

A diffraction pattern, of which FIG. 1B is an example, will lie in plane $P_2$ on the optical axis 14 of the transform lens $L_2$ with the zero order centered on the axis 14 and the lower spatial frequency components of the spectrum close to the optical axis. By the insertion of appropriate masks or filters in plane $P_2$, certain spatial frequency components may be attenuated and others passed. If a filter which selectively attenuates certain ones of the spatial frequency components of the diffraction pattern is inserted in plane $P_2$, then the reconstructed image in plane $P_3$ will be modified accordingly.

Filters which improve the overall quality of the image, increase the contrast, or enhance the edges of details in a scene are referred to as amplitude spatial frequency filters. Filters may also be matched to specific features in the scene such as straight lines or edges of a particular orientation. These are feature extraction or enhancement filters. A third type of filter is the matched filter for recognition. This filter is actually a hologram of the feature to be recognized. When the feature appears in the input image in the proper orientation, the filter causes the reference beam to be reconstructed in the output plane thus indicating recognition of the feature.

It is frequently desirable to process an image with more than one type of filter. For example, it might be desired to read a number comprised of 10 digits. Such a number might be processed with a set of filters each of which is capable of recognizing one of the ten digits. This processing would produce output signals which would permit machine reading of the number. In the prior art type of device shown in FIG. 2, this task can be performed by sequentially introducing into the system in the Fourier transformer plane $P_2$ the selection of filters which would be needed to process the image.

An alternative process would be to move the image from one complete image processor to another. In the latter situation, each processor would filter the image in a different manner. However, each of the above types of processing are tedious and time consuming. Furthermore, if comparisons are to be made between the outputs, it is necessary to store the outputs either on film or as television images on magnetic tape for future comparison.

Figure 3:
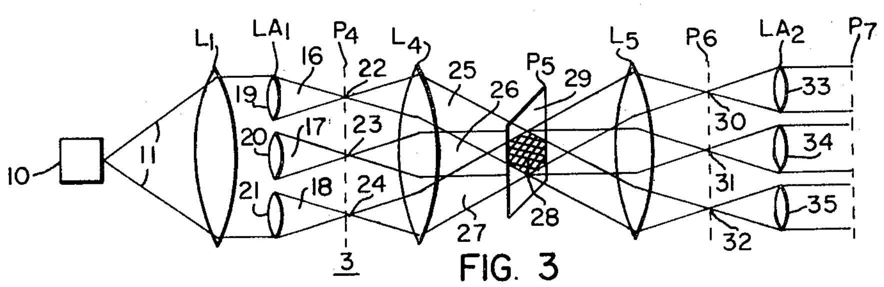
FIG. 3 shows an embodiment of the present invention.

The above disadvantages of the prior art have been obviated by the present invention of which the optical image processor 3 of FIG. 3 is an embodiment. As in the prior art devices, lens $L_1$ collimates the laser radiation 11 from laser 10. However, instead of being directed immediately to an input transparency, the light is first divided into a number of smaller beams of light 16, 17 and 18 by lenses 19, 20 and 21 of lens array $LA_1$. The lens array $LA_1$ focuses the radiation to an array of points 22, 23, 24 lying in the focal plane of lens $L_4$. The front focal plane of lens $L_4$ is designated in FIG. 3 as plane $P_4$.

Lens $L_4$ collimates the radiation from each of the point sources 22, 23, 24 produced by the lens array $LA_1$. Each of the collimated beams 25, 26, 27 are bent by the lens $L_4$ in such a manner that a portion of each of the beams passes through substantially the same portion of the back focal plane $P_5$ of lens $L_4$.

The input transparency 29 is also located in the focal plane, $P_5$, of lens $L_4$. As a result, the collimated beams 25, 26 and 27 are caused to pass through substantially the same portion of the transparency 29. The portion which is illuminated by the collimated beams is indicated by the cross-hatching 28 and covers a large center section of the input transparency 29. After passing through the transparency 29, the beams continue on until they are picked up by lens $L_5$.

The front focal plane of lens $L_5$ coincides with the back focal plane of lens $L_4$ in plane $P_5$. Lens $L_5$ is the transform lens. It brings each of the collimated beams 25, 26, 27 to a focus at points 30, 31, 32 in its back focal plane $P_6$. The position of each point 30, 31, 32 in the Fourier transform or filter plane $P_6$ is determined by the angle at which collimated beams 25, 26 and 27 are incident upon the transform lens $L_5$. At each point of focus 30, 31, 32 in the transform plane $P_6$, there appears a diffraction pattern of the input image. Because each of the diffraction patterns at the points 30, 31, 32 were formed as a result of collimated light beams 25, 26, and 27 passing through substantially the same area of the input transparency 29, the final diffraction patterns in plane $P_6$ will be almost identical.

A different filter is introduced at each of the positions 30, 31, 32. Because the diffraction patterns were initially substantially identical, providing the different filters in plane $P_6$ will result in simultaneously performing a plurality of filtering operations on the input transparency 29.

The images may be reconstructed in plane $P_7$ by lenses 33, 34, 35 of lens array $LA_2$. Each of the lenses in lens array $LA_2$ will produce a complete image as modified by the particular filter introduced at the points 30, 31, and 32 in the transform plane $P_6$. As in the basic system of the prior art, the reconstructing lenses 33, 34, 35 have one focal point in the transform plane $P_6$ and the other focal point in the output plane $P_7$.

The embodiment shown in FIG. 3 thus teaches the simultaneous use of a number of processing beams, each passing through the input transparency at a slightly different angle to produce a number of separate but substantially identical diffraction patterns in the transform plane. The diffraction patterns can then be processed by different spatial frequency filters. The various output images in plane $P_7$ can then be recorded on film, received by a television pickup or mosaic detectors and analyzed.

Figure 4:
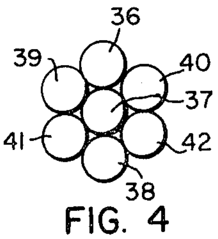
FIG. 4 shows a front view of an alternate lens array.

Although FIG. 3 shows only three lenses in each of the lens arrays $LA_1$ and $LA_2$, a larger number could easily be accommodated. FIG. 4, for example, shows another possible lens array arrangement. In FIG. 4, the lenses 36, 37, 38 which lie in a vertical line correspond to lenses 19, 20, 21 of FIG. 3. Lenses 39 and 40 are displaced 60° from lens 36 and lenses 41 and 42 are displaced at a similar angle from lens 38. This particular arrangement is useful because it affords compact arrangement of the lenses. Compactness is gained because circles arranged in a hexagonal pattern form a much more compact array than those arranged in a rectangular pattern. The lens arrangement shown in FIG. 4 can be used in place of either or both of lens arrays $LA_1$ and $LA_2$.

However, any number of lenses arranged in any manner could be used in lens array $LA_1$ and lens array $LA_2$. The only limitations upon the number of lenses that could be used are the diameter of the beam of light provided by collimating lens $L_1$, the diameter of the beams required in the sample space, and the bandwidth of the diffraction pattern.

An alternative to the use of an array of lenses such as lenses 19, 20, and 21 of FIG. 3 is a beam splitter. A typical beam splitter is shown in "Modern Optical Engineering" (1966) by W. J. Smith in FIG. 4.32 on page 95. The beam splitter takes a ray of light and divides it into two rays traveling in the same direction as the original ray. If more than two resultant rays are ultimately desired, additional beam splitters may be used on the two newly formed rays thereby dividing each of them into two new rays. Thus, the same result can be obtained as in the case of the lens arrays.

An additional way to obtain multiple beams is through the use of a multifaceted prism or mirror to divide a large diameter beam into a number of beams of smaller diameter. There are, of course, numerous techniques of obtaining a plurality of such beams which are well known to those skilled in the art. Any technique can be used which will provide the desired multiple beams.

An alternate technique could also be used to obtain the Fourier transforms in plane $P_6$. For example, individual lenses could be used in place of lens $L_5$ in order to obtain each of the Fourier transform diffraction patterns.

Figure 5:
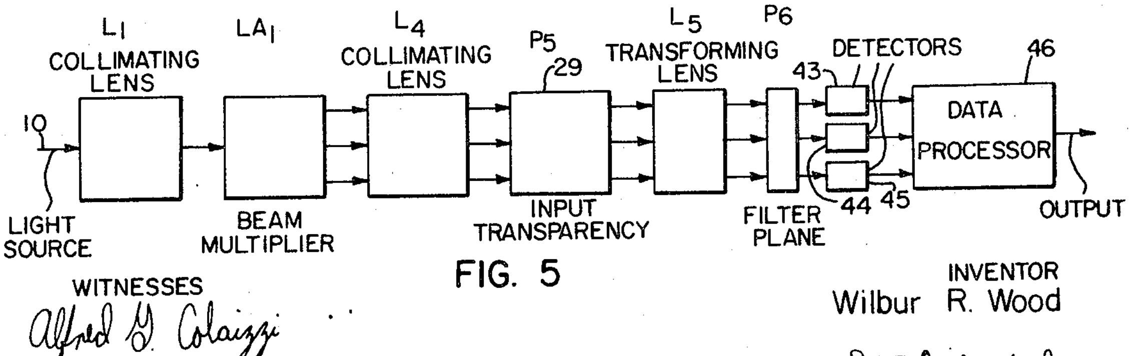
FIG. 5 shows a block diagram of a preferred embodiment of the present invention.

A preferred embodiment of a complete coherent optical image processor is shown in FIG. 5. The left-hand two-thirds of FIG. 5 is similar to the system shown in FIG. 3. Therefore, the same reference numerals have been used in FIG. 5 for the corresponding elements as they were shown in FIG. 3. The system shown in FIG. 5 operates in the same manner as the system of FIG. 3 up to plane $P_6$. The method of using the output from the filter plane $P_6$, however, is different.

Instead of using a second lens array as was the case in FIG. 3, and then recording the outputs on film for later analyzing, a different method of analyzing is used in this embodiment. In this case, detectors 43, 44, 45 are introduced just behind the filters in filter plane $P_6$. These detectors measure the intensity of the radiation signal which is passed by the array of filters in the plane $P_6$. The information picked up by the detectors is then fed to a data processor 46 where the results are analyzed.

The operation of the data processor 46 depends on what the filters are designed to do. If, for example, the optical processor has ten channels for processing the 10 digits of a number and each filter was matched to the diffraction pattern of one of the digits, the data processor will read the digits of the number. The output of the data processor will be the number in one form or another depending on the use to be made of the information.

For example, the data processor might convert the number to a binary code for use in a computer. In another case, if the optical processor is reading a zip code, the data processor might direct a mechanical sorter to move a letter to a particular bin.

If, however, the optical processor extracts feature information, then the data processor will decide on the basis of the features detected what the pattern (character, symbol e.g.) must be and then output the information in a form which is appropriate to its end use.

Whatever the end result, the embodiment illustrated in FIG. 5 is a very versatile and efficient optical image processor.

I claim as my invention:

1. A coherent optical image processor comprising an input transparency, a source of coherent light positioned to illuminate said input transparency, and optical system for generating at least two complete and separate diffraction patterns of the input transparency in a Fourier plane of said system and means for simultaneously performing a different filtering operation on each diffraction pattern.

2. The coherent optical image processor of claim 1, wherein said optical system includes a first means for generating a plurality of collimated light beams and for causing said light beams to be incident upon substantially a single portion of the input transparency; and a second means for performing a Fourier transformation on each of said collimated light beams and for directing each of the resultant diffraction patterns to a different position in said Fourier plane.

3. The coherent optical image processor of claim 2, wherein said first means includes a lens array positioned intermediate the source of coherent light and the input transparency for dividing the source light into a plurality of point sources.

4. The coherent optical image processor of claim 3, wherein the lens array comprises a plurality of positive condensing lenses situated intermediate two collimating lenses.

5. The coherent optical image processor of claim 2, wherein said first means includes at least one beam multiplier positioned intermediate the source of coherent light and the input transparency.

6. The coherent optical image processor of claim 1, including a means to reconstruct each image after it has been filtered.

7. The coherent optical image processor of claim 6, wherein the image reconstructing means is comprised of a portion of the said optical system and includes a lens array consisting of at least two lenses.

8. The coherent optical image processor of claim 2, wherein said second means includes at least one lens.

9. The coherent optical image processor of claim 2, wherein said second means includes a plurality of lenses.

10. The coherent optical image processor of claim 1, including a detection means positioned behind said filter means for measuring the intensity and pattern of the filtered pattern; and a data processor for analyzing the information measured by said detection means.

* * * * *